(12) United States Patent
Johnson et al.

(10) Patent No.: US 9,002,070 B2
(45) Date of Patent: Apr. 7, 2015

(54) AUTOMATED SEED PACKAGE IDENTIFICATION APPARATUS, SYSTEM, AND METHOD

(75) Inventors: David L. Johnson, Johnston, IA (US); Jacob T. Klocke, Elkhart, IA (US); Lyndon J. Schroeder, Urbandale, IA (US); Mark W. Spicer, Ankeny, IA (US)

(73) Assignee: Pioneer Hi Bred International Inc, Johnston, IA (US)

( * ) Notice: Subject to any disclaimer, the term of this patent is extended or adjusted under 35 U.S.C. 154(b) by 498 days.

(21) Appl. No.: 13/351,697

(22) Filed: Jan. 17, 2012

(65) Prior Publication Data

US 2012/0188364 A1 Jul. 26, 2012

Related U.S. Application Data

(60) Provisional application No. 61/436,101, filed on Jan. 25, 2011.

(51) Int. Cl.
*G06K 9/00* (2006.01)
*A01C 21/00* (2006.01)
*A01B 79/00* (2006.01)

(52) U.S. Cl.
CPC ............... *A01C 21/00* (2013.01); *A01B 79/005* (2013.01); *G06K 2209/19* (2013.01)

(58) Field of Classification Search
None
See application file for complete search history.

(56) References Cited

U.S. PATENT DOCUMENTS

| 6,199,000 | B1 | 3/2001 | Keller et al. | |
| 6,996,484 | B2 * | 2/2006 | Raitter | 702/81 |
| 7,104,453 | B1 | 9/2006 | Zhu et al. | |
| 2003/0072484 | A1 * | 4/2003 | Kokko et al. | 382/155 |
| 2004/0165748 | A1 * | 8/2004 | Bonner et al. | 382/101 |
| 2006/0112628 | A1 * | 6/2006 | Kotyk et al. | 47/58.1 SE |
| 2007/0230770 | A1 * | 10/2007 | Kulkarni et al. | 382/149 |

(Continued)

FOREIGN PATENT DOCUMENTS

WO  WO 2012/102903  8/2012

OTHER PUBLICATIONS

International Search Report and Written Opinion from International Application No. PCT/US2012/021545, mailed Aug. 30, 2012.

(Continued)

*Primary Examiner* — Jon Chang
*Assistant Examiner* — Oneal R Mistry
(74) *Attorney, Agent, or Firm* — Pioneer Hi-Bred Int'l.

(57) ABSTRACT

An automated seed package identification apparatus is presented that may include a sensor device configured to read a machine-readable package identifier on a seed package which identifies the seed package and/or the seeds therein. A sensor positioning mechanism adjusts the position of the sensor device with respect to a seed tray assembly which is configured to retain seed packages. The sensor positioning mechanism may include a moveable track member which translates on a stationary track member, and the sensor device may translate along the moveable track member. A control unit may instruct the sensor positioning mechanism to move with respect to the seed tray assembly to thereby read the machine-readable package identifiers with the sensor device and record the positional layout of the seed packages. One or more cameras may be configured to capture one or more images of the plurality of seed packages retained in the seed tray assembly.

33 Claims, 14 Drawing Sheets

(56) References Cited

U.S. PATENT DOCUMENTS

| | | | |
|---|---|---|---|
| 2008/0009962 A1* | 1/2008 | Hood et al. | 700/213 |
| 2008/0230449 A1* | 9/2008 | Stemmle | 209/584 |
| 2008/0310674 A1* | 12/2008 | Modiano et al. | 382/100 |
| 2008/0317279 A1* | 12/2008 | Deppermann et al. | 382/100 |
| 2009/0010750 A1 | 1/2009 | Goldman et al. | |
| 2010/0005011 A1 | 1/2010 | Dewey, Jr. et al. | |
| 2010/0070072 A1 | 3/2010 | Goldman et al. | |
| 2010/0082151 A1* | 4/2010 | Young et al. | 700/226 |
| 2011/0054235 A1* | 3/2011 | Drobnik et al. | 600/8 |
| 2011/0235054 A1* | 9/2011 | Koike et al. | 356/620 |
| 2012/0087569 A1* | 4/2012 | O'Dell et al. | 382/149 |
| 2012/0106787 A1* | 5/2012 | Nechiporenko et al. | 382/103 |
| 2012/0116572 A1* | 5/2012 | Corak et al. | 700/223 |

OTHER PUBLICATIONS

International Preliminary Report on Patentability issued Jul. 30, 2013 for PCT/US2012/021545, which was filed Jan. 17, 2012 [Inventor—Johnson, et al.; Applicant—Pioneer Hi-Bred International, Inc.] [6 pages].

Barcode Software—Omniplanar, Inc.; Downloaded on Apr. 17, 2012 from http://www.omniplanar.com/index.php.

Leadtools—The World Leader in Imaging SDKs; Downloaded on Apr. 17, 2012 from http://www.leadtools.com/default.htm.

* cited by examiner

FIG. 11

AUTOMATED SEED PACKAGE IDENTIFICATION APPARATUS, SYSTEM, AND METHOD

CROSS-REFERENCE TO RELATED APPLICATIONS

The present application claims priority from U.S. Provisional Application No. 61/436,101, filed Jan. 25, 2011, which is hereby incorporated herein by reference in its entirety.

FIELD OF THE INVENTION

Various embodiments of the present invention relate generally to an automated system, method, and apparatus for identifying seed packages. More specifically, embodiments of the present invention provide an automated system, method, and apparatus configured to identify and error check seed packages using a sensor device.

BACKGROUND OF THE INVENTION

It is typical for a company in the agricultural seed industry to generate one or more research plots in order to evaluate certain seed varieties. Such seed varieties may include, but need not be limited to, seeds from a specific source, genotype, and/or breeding line. In such a manner, researchers may evaluate characteristics of the plants growing in the research plot, as well as characteristics of any crops produced from the plants. In some instances these characteristics may be compared to plants grown from different seed varieties in the research plot. Thus, certain experiments may require a researcher to plant many different seed varieties in the research plot at approximately the same time. Additionally, a researcher may desire to plant various seed varieties in relatively close proximity to other seed varieties.

Traditional research plot planting is a largely manual process. Conventional techniques require seed samples to be packaged in small paper coin envelopes, which are manually opened at the desired planting locations in order to deposit the seed samples for planting research plots. In many instances this is accomplished by using a mobile planter transport device that transports a research seed planter configured to carry a seed planting operator. However, recent innovations have automated the seed planting process. For example, U.S. Patent Application Publication No. 2010/0070072, which is assigned to the assignee of the present application, teaches an automated research planting system, method and apparatus.

As illustrated in FIG. 1, one embodiment of U.S. Patent Application Publication No. 2010/0070072 teaches a research seed planter 102. In the depicted embodiment, the research seed planter 102 is configured to be transported via a mobile planter transport device and is configured to plant a plurality of rows of seed in a research plot for each pass of the research seed planter 102. The research seed planter 102 includes a plurality of seed package handling devices 104, each one being dedicated for one or more rows to be planted. Each seed package handling device 104 includes a seed tray assembly 105 configured to carry one or more seed packages 200, with each seed package 200 being configured to contain a research seed sample comprising one or more seeds. Each seed package handling device 104 automatically opens associated seed packages 200 and releases research seed samples into a respective seed handling chute 106, which directs the seed into a respective seed metering device 108. When each seed package handling device 104 is configured to provide seeds to more than one row, the research seed planter 102 may further comprise a splitter or diverter into which the seeds are dropped in order to feed the seeds to respective rows. Associated with each row to be planted by the research seed planter 102 is a conventional furrow opening apparatus 107 and a conventional furrow closing apparatus 109. Although various configurations of furrow opening and closing apparatuses are possible, in the depicted embodiment, the furrow opening apparatus 107 may include a pair of laterally spaced furrow opening discs and a pair of gauge wheels configured to set the depth of the furrow. The furrow closing apparatus 109 may comprise a pair of furrow closing discs. In general, as the research seed planter 102 moves through the research plot, the furrow opening apparatus 107 opens a furrow, and individual seeds are released by the seed metering device through a drop tube and into the research plot. The furrow closing apparatus 109 then closes the furrow. Seed packages that have been opened are automatically deposited into respective waste containers 111, which are associated with each seed package handling device 104.

In a research setting, the ability to accurately, consistently, and predictably populate a research plot is very important. By automating the seed planting process as described above, the research plots may be planted with considerably more accuracy than in the past, which relied on manual processes. However, automated seed planting is only as accurate as the arrangement of the seed packages within the seed tray assembly. Present methods of verifying the arrangement of the seed packages typically rely on manual verification of the arrangement of the seed packages, which may require significant quantities of time, and still potentially suffer from human error. Accordingly, further improvements in seed planting apparatuses and methods may be desirable.

BRIEF SUMMARY

In one embodiment an automated package identification system may comprise a tray assembly configured to retain a plurality of packages, wherein the packages each comprise one or more machine-readable package identifiers. A tray assembly stand may be configured to position the tray assembly in an identification configuration. Further, an automated package identification apparatus may comprise a sensor device configured to read the machine-readable package identifiers of the packages, a sensor positioning mechanism configured to adjust a position of the sensor device with respect to the tray assembly, and a control unit configured to instruct the sensor positioning mechanism to adjust the position of the sensor device with respect to the tray assembly and configured to instruct the sensor device to read the machine-readable package identifiers of the packages to thereby record a positional layout of the packages.

The control unit may be further configured to compare the positional layout of the packages to a desired layout of the packages. The control unit may be further configured to indicate which of the packages does not match the desired layout. Further, the sensor device may be configured to read a machine-readable tray identifier on the tray assembly so that the control unit may thereby determine the desired layout of the packages. They system may further comprise an adjustable bracket coupling the sensor device to the sensor positioning mechanism, wherein the adjustable bracket is configured to adjust at least one of an angle of the sensor device with respect to the tray assembly and a distance between the sensor device and the tray assembly. Also, the sensor device comprises a device selected from the group consisting of a bar code reader, an OCR reader, an RFID reader, a digital camera, and combinations thereof. Additionally, the tray assembly stand may position the tray assembly at an angle with respect to a vertical direction.

In a further embodiment a method of identifying a plurality of packages each comprising one or more machine-readable package identifiers is provided. The method may comprise retaining the plurality of packages in a tray assembly, positioning a sensor device proximate the packages using a sensor positioning mechanism, reading the machine-readable package identifiers of each of the packages with a sensor device, and recording a positional layout of the packages.

Further, the method may include comparing the positional layout of the packages to a desired layout of the packages. Also, the method may comprise indicating which of the packages do not match the desired layout. The method may additionally include indicating a position of one of the packages that would match the desired layout for one of the packages that does not match the desired layout. The method may further comprise reading a machine-readable tray identifier on the tray assembly with the sensor device to thereby determine the desired layout of the packages.

The method may also include indicating which of the packages have not had their machine-readable package identifiers successfully read. Additionally, the method may comprise displaying an image of each of the packages that have not had their machine-readable package identifiers successfully read. Further, the method may comprise providing for confirmation of whether or not the packages that have not had their machine-readable package identifiers successfully read match the desired layout. The method may additionally include positioning the sensor device at a starting position prior to positioning the sensor device proximate the packages. Also, the method may further comprise detecting proximity to the packages prior to reading the machine-readable package identifiers of each of the packages. Additionally, the method may comprise indicating the packages for which proximity is not detected.

In an additional embodiment an automated package identification apparatus is provided. The apparatus may comprise a sensor device configured to read a plurality of machine-readable package identifiers from a plurality of packages retained in a tray assembly, a sensor positioning mechanism configured to position the sensor device with respect to the tray assembly, and a control unit configured to instruct the sensor positioning mechanism to adjust the position of the sensor device with respect to the tray assembly and configured to instruct the sensor device to read the machine-readable package identifiers of the packages to thereby record a positional layout of the packages.

The sensor positioning mechanism may comprise a stationary track member and a moveable track member. Further, the moveable track member may be configured to translate along the stationary track member. Also, the sensor device may be configured to translate along the moveable track member. The apparatus may additionally comprise a stationary electric motor configured to translate the moveable track member and a moveable electric motor configured to translate the sensor device. Further, the apparatus may include a moveable track carriage which moveably couples the moveable track member to the stationary track member and a sensor carriage which moveably couples the sensor device to the moveable track member. Additionally, the apparatus may include an adjustable bracket coupling the sensor device to the sensor positioning mechanism, wherein the adjustable bracket is configured to adjust at least one of an angle of the sensor device with respect to the seed tray assembly and a distance between the sensor device and the seed tray assembly.

In a further embodiment an automated package identification system is provided. The system comprises a tray assembly configured to retain a plurality of packages, and an automated package identification apparatus. The automated package identification apparatus comprises one or more cameras configured to capture one or more images of the plurality of packages retained in the tray assembly, and an image processing system configured to process the one or more images and to generate a positional layout of the packages in the tray assembly. The automated package identification apparatus may comprise a single camera and the system may further comprise a pivot mechanism configured to pivot the camera around one or more axes. The pivot mechanism may be controlled by a position control system. The automated package identification apparatus may also comprise multiple cameras, and the image processing system may process an array of images that cover the tray assembly. The image processing system may be further configured to merge the array of images into one image before the image processing system processes the image.

In a further embodiment, a method of identifying a plurality of packages is provided. The method comprises retaining the plurality of packages in a tray assembly, capturing one or more images of the tray assembly using one or more cameras, processing the one or more images using an image processing system, and generating a positional layout of the packages in the package assembly. The packages may each comprise one or more machine-readable package identifiers, and the method may further comprise decoding the machine-readable package identifiers. The operation of capturing one or more images of the tray assembly may comprise capturing multiple images of the tray assembly using multiple cameras. The method may further comprise merging the multiple images into one image before processing by the image processing system. The operation of capturing one or more images of the tray assembly may comprise capturing one image of the tray assembly using a single camera. The operation of capturing one or more images of the tray assembly may comprise capturing multiple images of the tray assembly using a single camera, and the method may further comprise pivoting the camera around an axis using a pivot mechanism to capture the multiple images.

In a further embodiment, a method of processing an image of packages in a tray assembly is provided where the image is captured by one or more cameras of an automated package identification system. The method comprises identifying a plurality of areas of interest in the image, processing subsets of the image contained within the areas of interest, and generating a representation of the seed tray assembly using the subsets of the image contained within the areas of interest. The method may further comprise at least one of using a predefined list of coordinates representing the areas of interest, and defining coordinates of the areas of interest from known structures in the image. Further, the coordinates may be stored in a data store. The method may further comprise decoding one or more machine-readable identifiers within the subsets of the image. The method may further comprise storing the decoded machine-readable identifiers in a data store. The method may also further comprise decoding one or more machine-readable identifiers within the subsets of the image, and combining the defined coordinated with the decoded machine readable identifiers. Further, the representation of the seed tray assembly may be stored in a data store.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

FIG. 11 illustrates a screenshot from the monitor of FIG. 9 indicating a position of one of the seed packages that would match the desired layout for a location in the tray assembly at which a seed package is read but does not match the desired layout in accordance with an example embodiment of the present invention;

DETAILED DESCRIPTION

The present invention now will be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

Figure 1:
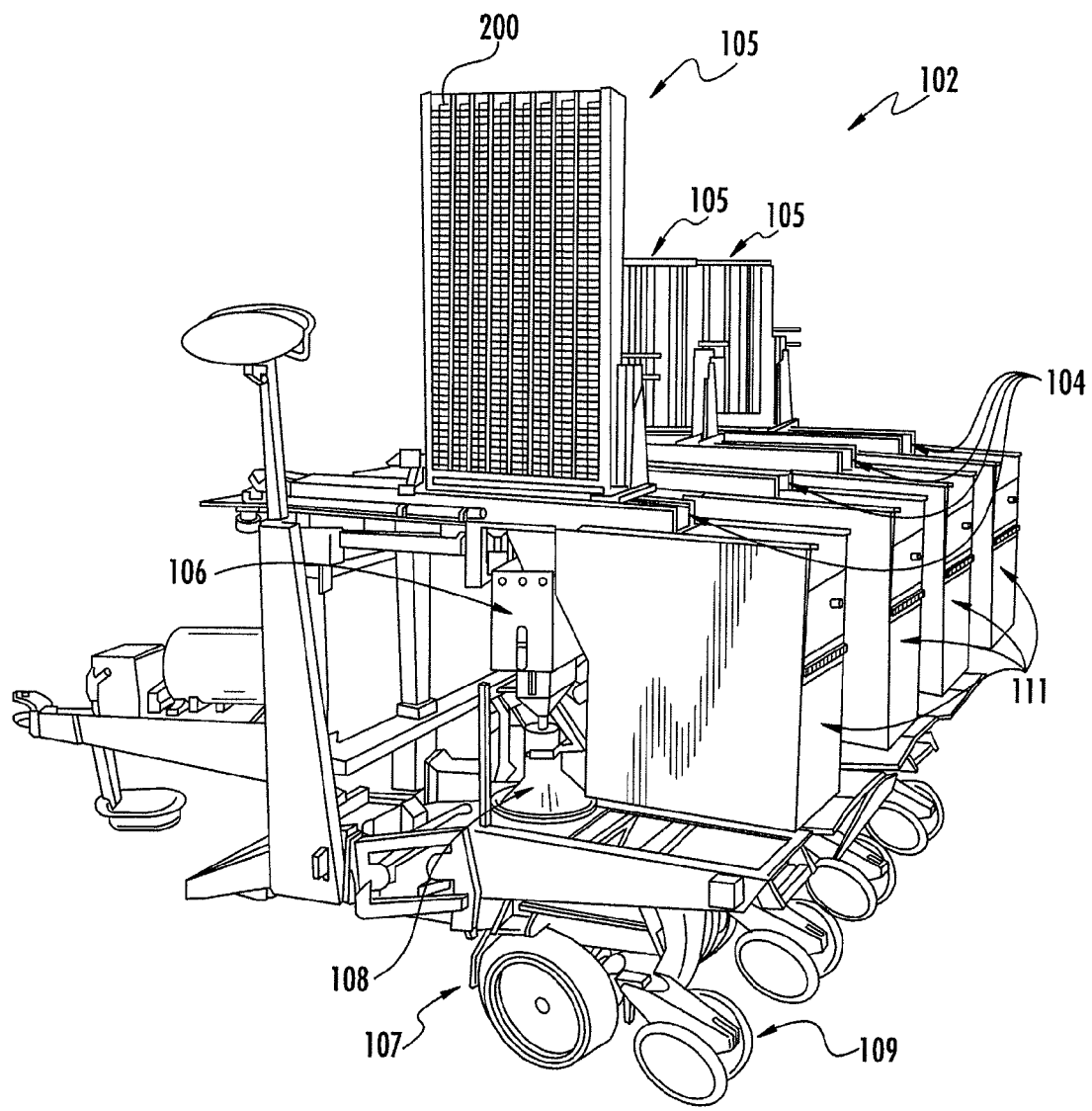
FIG. 1 illustrates an embodiment of a research seed planter which may plant seeds from seed packages in seed tray assemblies.
Figure 2:
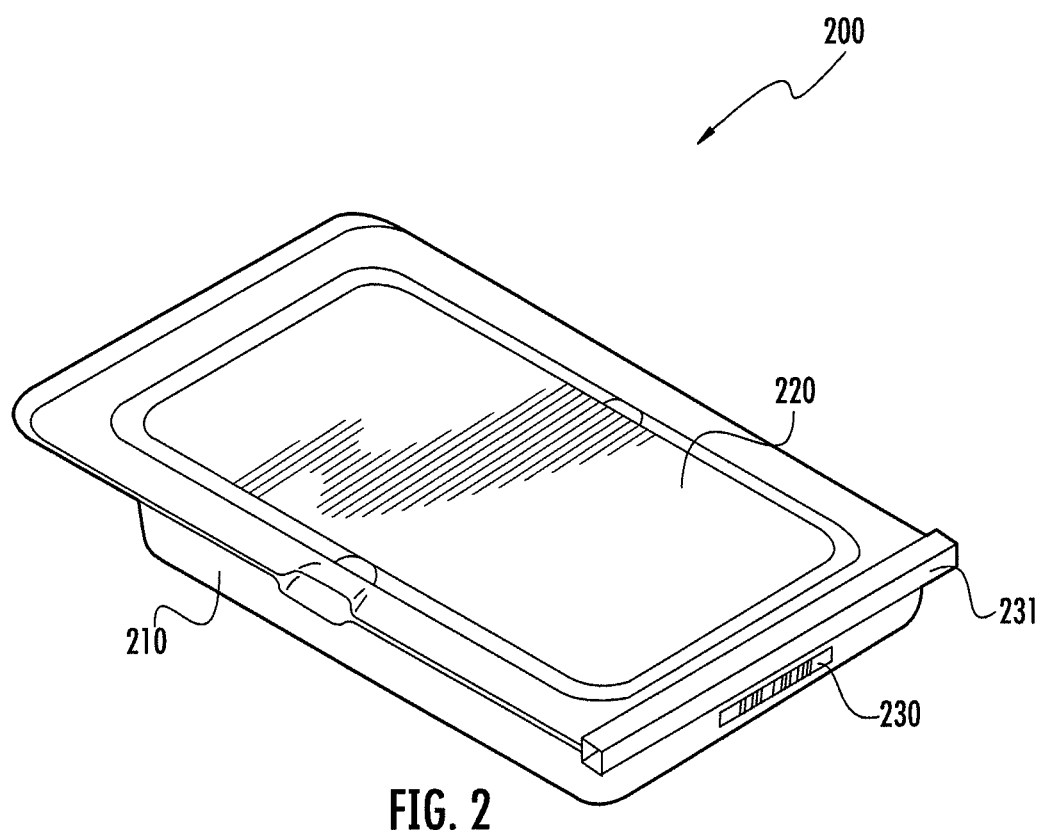
FIG. 2 illustrates a seed package in a closed position which may be filled with seeds and inserted into a seed tray assembly in accordance with an example embodiment of the present invention.

As described above, the ability of a research planter, for example the research planter 102 illustrated in FIG. 1, to accurately plant seeds in desired locations is limited by the accuracy of the placement of seed packages within seed tray assemblies. Accordingly, the ability to accurately identify seed packages is of value in loading seed packages into seed tray assemblies. In this regard, FIG. 2 illustrates an example seed package 200 of a type that may be used in conjunction with the seed package handling device 104 shown in FIG. 1 in accordance with one exemplary embodiment of the present invention. Specifically, FIG. 2 shows a perspective view of a seed package 200, in a closed position. As shown, the seed package 200 may generally comprise a container portion 210 and a cover portion 220 configured to cooperate with the container portion to selectively close and open the seed package. In order to make the seed package 200 identifiable, the seed package may further include a machine-readable package identifier 230. The machine-readable package identifier 230 may, for example, comprise a one-dimensional (1D) barcode, two-dimensional barcode (2D) barcode, text, radio frequency identification (RFID) transponder, or other identifier which identifies the type of seeds within the seed package or the seed package itself. The machine-readable package identifier 230 may be, for example, etched, printed, affixed or otherwise provided on the seed package 200. It should be noted, however, that various other embodiments of seed packages and machine-readable package identifiers may be employed in accordance with embodiments of the automated seed package identification system as will be described below.

Figure 3:
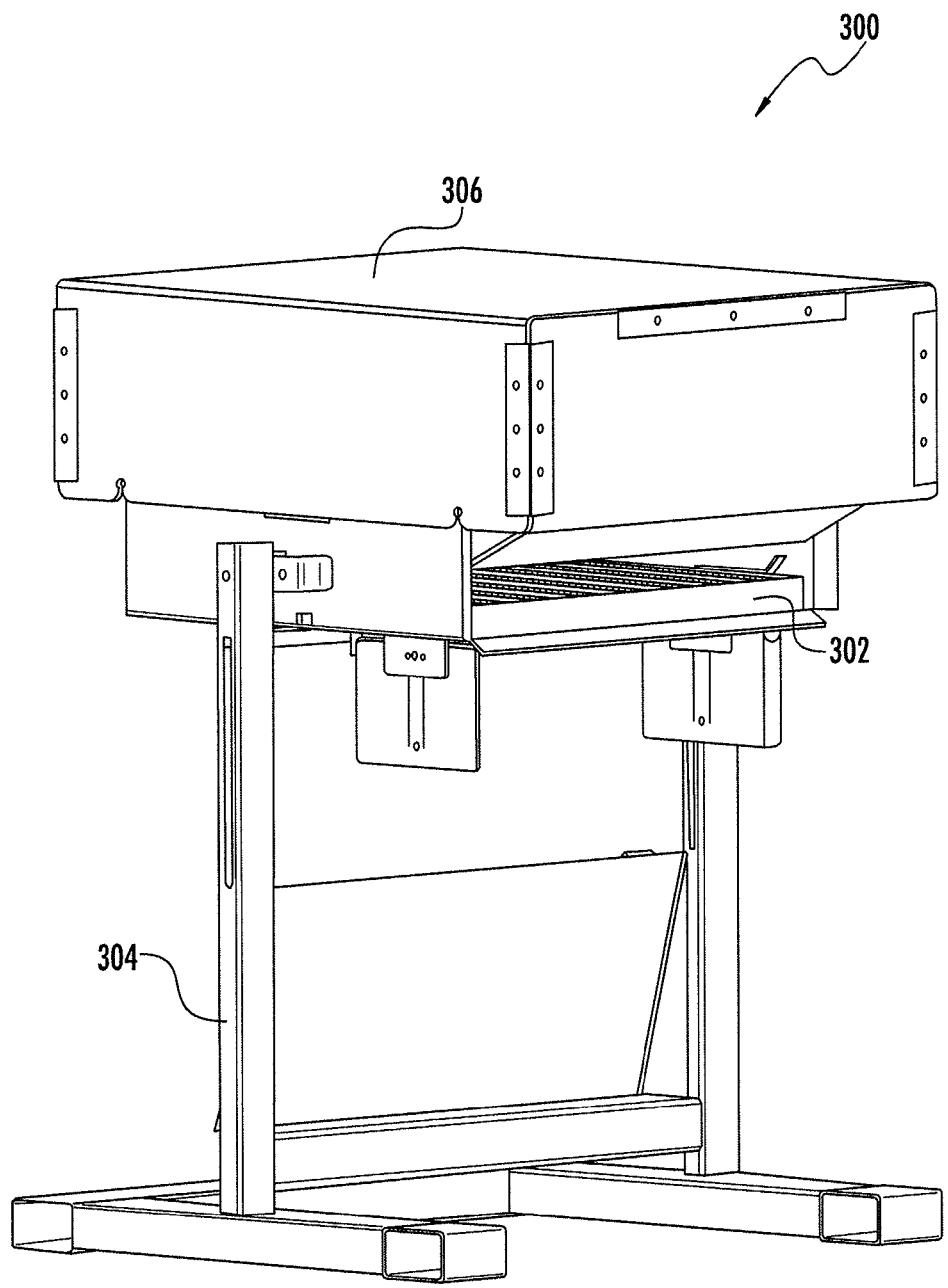
FIG. 3 illustrates a first embodiment of an automated seed package identification system in an identification configuration in accordance with an example embodiment of the present invention.

The machine-readable package identifiers 230 may be read manually by a user positioning a sensor device in proximity to the seed packages 200 to read the machine-readable package identifiers of the seed packages. However, manual scanning still leaves the potential for human error. In this regard, FIG. 3 illustrates a first embodiment of an automated seed package identification system 300. The automated seed package identification system 300 may comprise a seed tray assembly 302 configured to retain a plurality of seed packages which comprise one or more machine-readable package identifiers. For example the seed tray assembly 302 may be configured to retain the seed package 200 illustrated in FIG. 2. In one embodiment the seed tray assembly 302 included with the automated seed package identification system 300 may be substantially similar to the seed tray assembly 105 illustrated in FIG. 1. As illustrated, the automated seed package identification system 300 may include a stand 304 which allows the automated seed package identification system 300 to rotate or otherwise change configurations so as to position the seed tray assembly 302 in an identification configuration. In this regard, for example, some embodiments of the seed tray assembly 302 may substantially hold the seed packages in place such that they will not fall over or otherwise move when inserted into the seed tray assembly. Accordingly, the seed tray assembly 302 may be loaded into and scanned in the automated seed package identification system 300 in a variety of configurations, for example horizontally as illustrated in FIG. 3.

Figure 4:
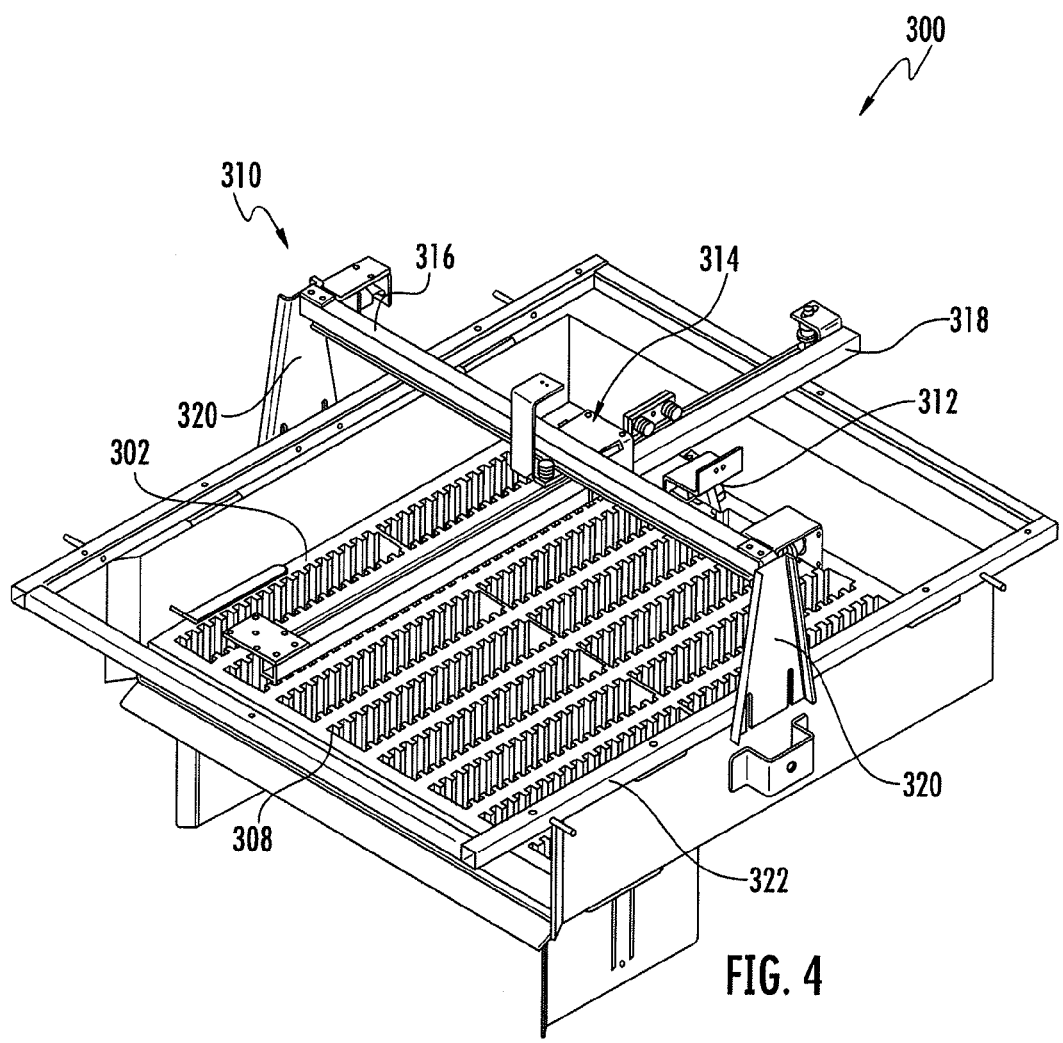
FIG. 4 illustrates a portion of the automated seed package identification system of FIG. 3 with a protective cover removed in accordance with an example embodiment of the present invention.

As shown in FIG. 4, which illustrates the automated seed package identification system 300 with a protective cover 306 and the stand 304 removed for clarity purposes, the seed tray assembly 302 may comprise a plurality of pockets 308 configured to respectively hold seed packages and prevent them from moving. Further, the seed tray assembly 302 may be formed from a material such as foam which deflects and forms an interference fit with the seed packages when they are inserted therein, which further assists in preventing movement of the seed packages within the seed tray assembly. However, in other embodiments the seed tray assembly may not comprise pockets or a material which deflects. For example, the seed tray assembly may be formed from aluminum. Therefore, the stand 304 as illustrated in FIG. 3 may position the seed assembly tray at an angle between horizontal and vertical which allows the force of gravity to substantially retain the seed containers in respective columns within the seed tray assembly without falling over, whereas the illustrated seed assembly tray 302 in alternate positions, for example horizontal as shown.

Returning to FIG. 4, the automated seed package identification system 300 may further comprise an automated seed package identification apparatus 310. The automated seed package identification apparatus 310 may comprise a sensor device 312, a sensor positioning mechanism 314, and a control unit. The sensor positioning mechanism 314 may comprise a stationary track member 316 and a moveable track member 318. The stationary track member 316 may be fixed in place relative to the seed tray assembly 302 by brackets 320 which couple to a frame 322 of the automated seed package identification system 300. However, the moveable track member 318 may be configured to translate along the stationary track member 316.

Figure 5:
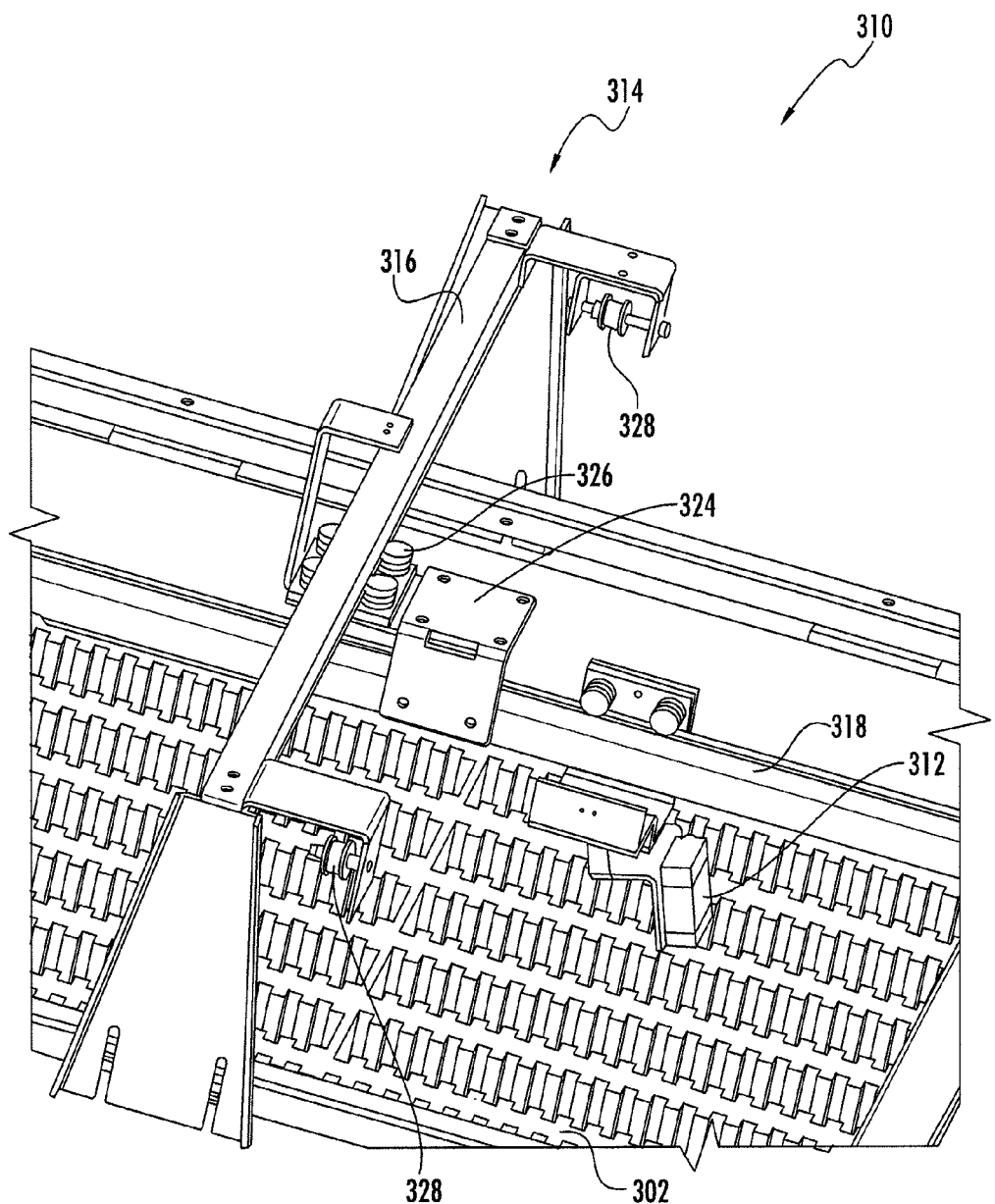
FIG. 5 illustrates a sensor positioning mechanism of the automated seed package identification system of FIG. 3 in accordance with an example embodiment of the present invention.

In this regard, FIG. 5 illustrates an enlarged partial view of the automated seed package identification apparatus 310. As described above, the moveable track member 318 may be configured to translate along the stationary track member 316. Movement of the moveable track member 318 relative to the stationary track 316 member may be facilitated by use of a moveable track carriage 324. The moveable track carriage 324 moveably couples the moveable track member 318 to the stationary track member 316. For example, in the illustrated embodiment the moveable track carriage 324 comprises a plurality of rollers 326 which engage and roll on the stationary track member 316. Thereby, for example, an electric motor (see, e.g. stationary electric motor 346' in FIG. 8) may actuate a belt, chain, or similar mechanism (not shown) coupled to the moveable track carriage 324 and looped round one or more pulleys 328 to translate the moveable track carriage and the attached moveable track member 318 relative to the seed tray assembly 302.

Figure 6:
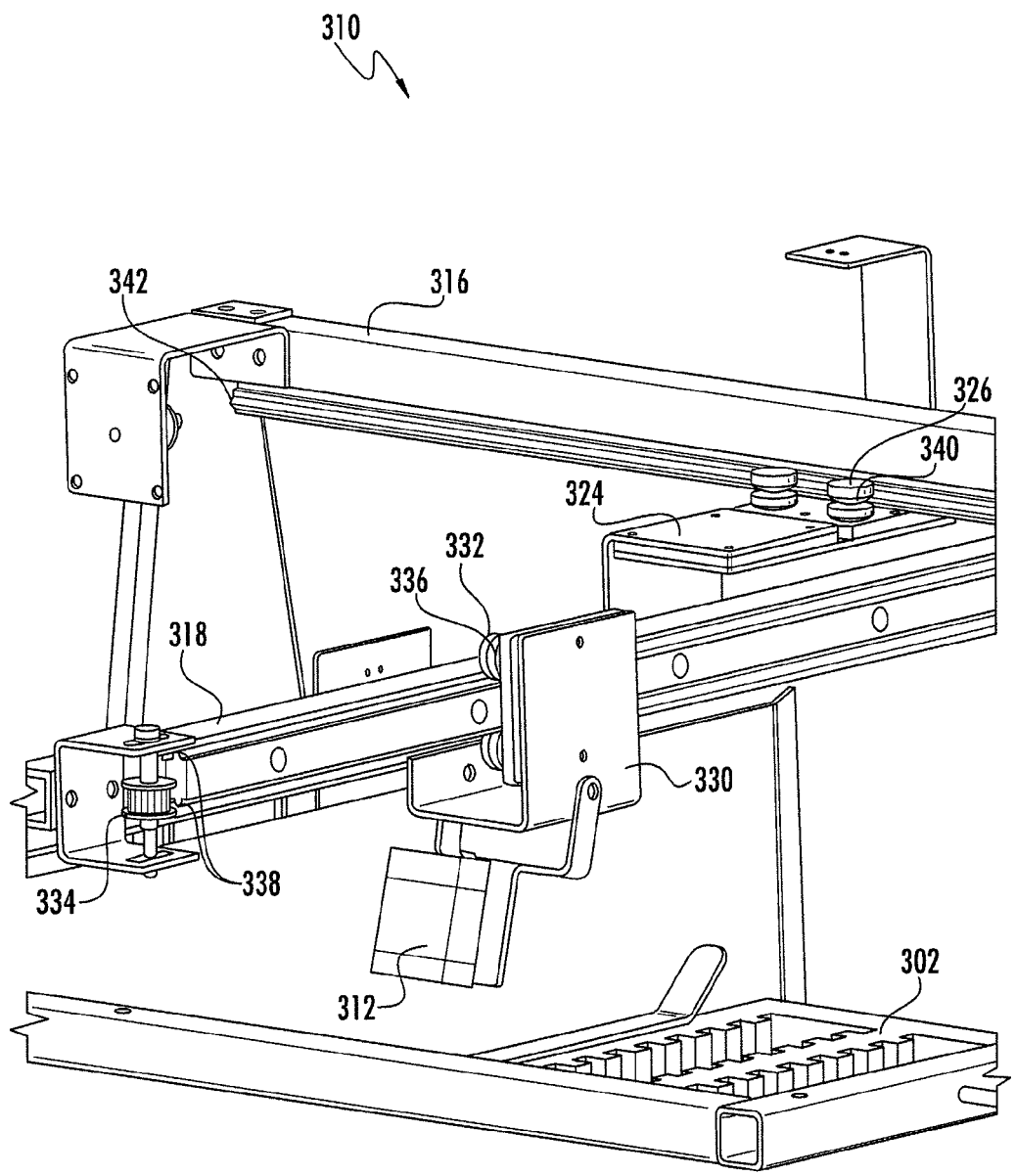
FIG. 6 illustrates a stationary track member and a moveable track member of the sensor positioning mechanism of FIG. 5 in accordance with an example embodiment of the present invention.

FIG. 6 illustrates an additional enlarged partial view of the automated seed package identification apparatus 310. As illustrated in FIG. 6, the automated seed package identification apparatus 310 may further comprise a sensor carriage 330. The sensor carriage 330 may moveably couple the sensor device 312 to the moveable track member 318. Accordingly, the sensor device 312 may translate along the moveable track member 318. In this regard, the sensor carriage 330 may comprise a plurality of rollers 332 which engage the moveable track member 318. Thereby, for example, an electric motor (see, e.g. moveable electric motor 348' in FIG. 8) may actuate a belt, chain, or similar mechanism (not shown) coupled to the sensor carriage 330 and looped round one or more pulleys 334 to translate the sensor carriage and the attached sensor device 312 relative to the seed tray assembly 302.

In order to assist in attaching the sensor carriage 330 to the moveable track member 318 while allowing for translation of the sensor carriage along the moveable track member, the rollers 332 may comprise grooves 336 which engage angled protrusions 338 extending from the moveable track. The engagement of the angled protrusions 338 of the moveable track member 318 with the grooves 336 in the rollers 332 may serve to align the sensor carriage 330 such that the sensor carriage travels in a direction substantially parallel with the longitudinal length of the moveable track member when the sensor carriage moves along the moveable track member. Similarly, the moveable track carriage 324 may include grooves 340 in the rollers 326 which engage angled protrusions 342 extending from the stationary track member 316 and thereby allow the moveable track carriage to translate the moveable track member 318 in a direction substantially parallel with the longitudinal length of the stationary track member. Thereby, due to the moveable track member 318 being configured to translate along the stationary track member 316, and the sensor carriage 330 being configured to translate along the moveable track member, the sensor device 312 may be moved to various positions with respect to the seed tray assembly 302.

Figure 7:
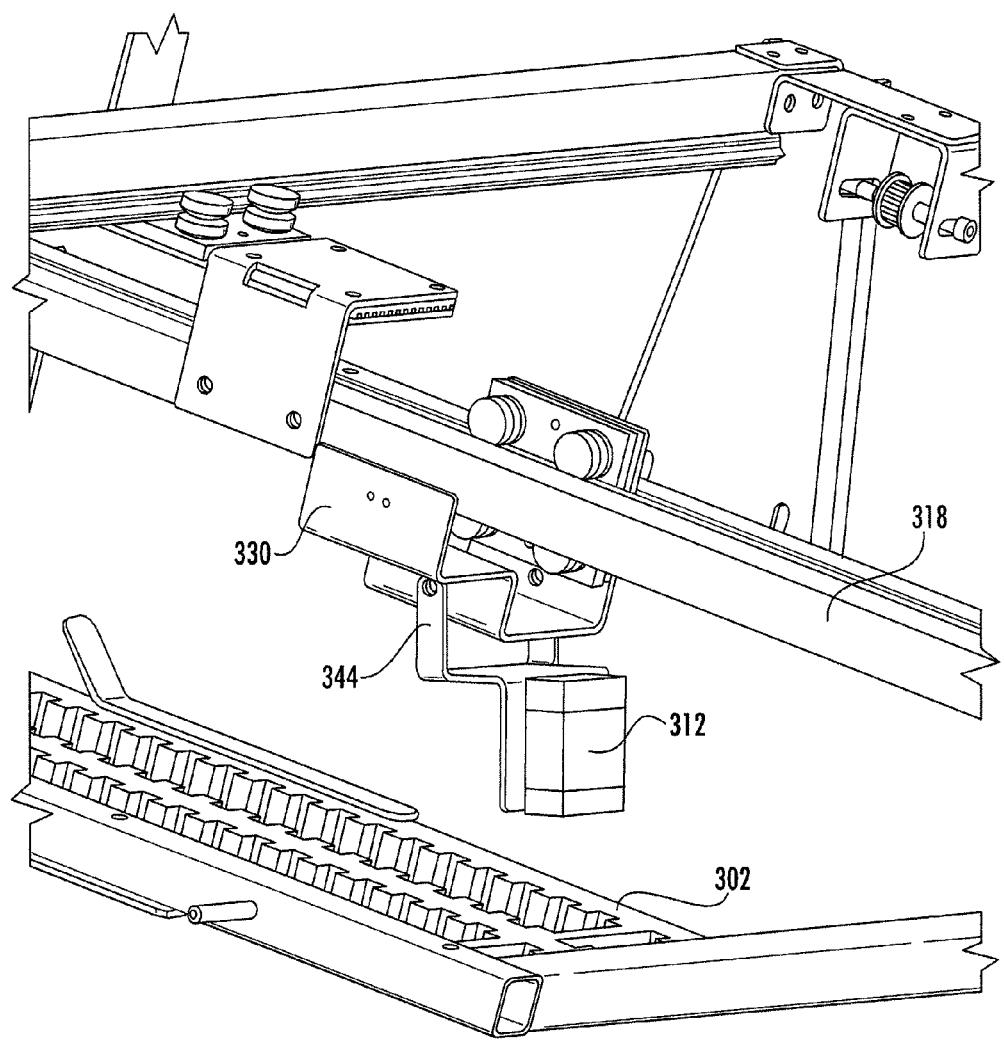
FIG. 7 illustrates an adjustable bracket which couples a sensor device to the sensor positioning mechanism of FIG. 5 in accordance with an example embodiment of the present invention.

The above-described sensor positioning mechanism 314 may also provide for movement which is generally planar. Therefore, as illustrated in FIG. 7, some embodiments of the automated seed package identification apparatus 310 further comprise an adjustable bracket 344 which couples the sensor device 312 to the sensor carriage 330 of the sensor positioning mechanism 314. The adjustable bracket 344 may be configured to adjust at least one of an angle of the sensor device 312 with respect to the seed tray assembly 302 and a distance between the sensor device and the seed tray assembly. In the illustrated embodiment the adjustable bracket 344 is configured to rotate, and thereby rotation of the adjustable bracket adjusts both the angle of the sensor device 312 with respect to the seed tray assembly 302 and a distance between the sensor device and the seed tray assembly. Accordingly, the adjustable bracket 344 may be used to adjust the sensor device 312 to optimize the position of the sensor device so that the sensor device may more effectively read the machine-readable identifiers of the seed packages.

With further regard to reading the machine-readable package identifiers of the seed packages, the sensor device 312 may comprise various types of sensors. For example, in some embodiments the sensor device 312 may comprise a barcode scanner capable of reading one or more barcodes (including, for example 1D and 2D barcodes), an optical character recognition (OCR) reader capable of reading human-readable information, an RFID reader capable of identifying an RFID transponder associated with the seed package assembly, and/or any combination of the above. Accordingly, selection of the sensor device 312 may depend on the type of machine-readable package identifier.

In some embodiments the automated seed package identification apparatus 310 may further comprise a proximity sensor (not illustrated). The proximity sensor may be positioned on the sensor positioning mechanism 314 in some embodiments. For example, the proximity sensor may be positioned near the sensor device 312 such that it travels therewith as the sensor device is moved by the sensor positioning mechanism 314.

The proximity sensor may be configured to detect proximity to the seed packages 200. In one embodiment the proximity sensor may be configured to detect a hinge 231 defined by each seed package 200, as illustrated in FIG. 2, or other feature defined by the seed packages or the seed tray assembly 302. Accordingly, in such embodiments when proximity is detected (for example when proximity is detected to the hinge 231), the sensor device 312 may begin scanning for a machine-readable package identifier such as a barcode, as described above. Accordingly, the proximity sensor may in some embodiments be used to determine when the sensor device 312 is near a machine-readable package identifier such that the sensor device may be activated. Note that although described above as a separate sensor, in some embodiments the sensor device 312 may comprise the proximity sensor. In this regard, in some embodiments the sensor device 312 may be configured to detect proximity and read the machine-readable package identifiers.

Figure 8:
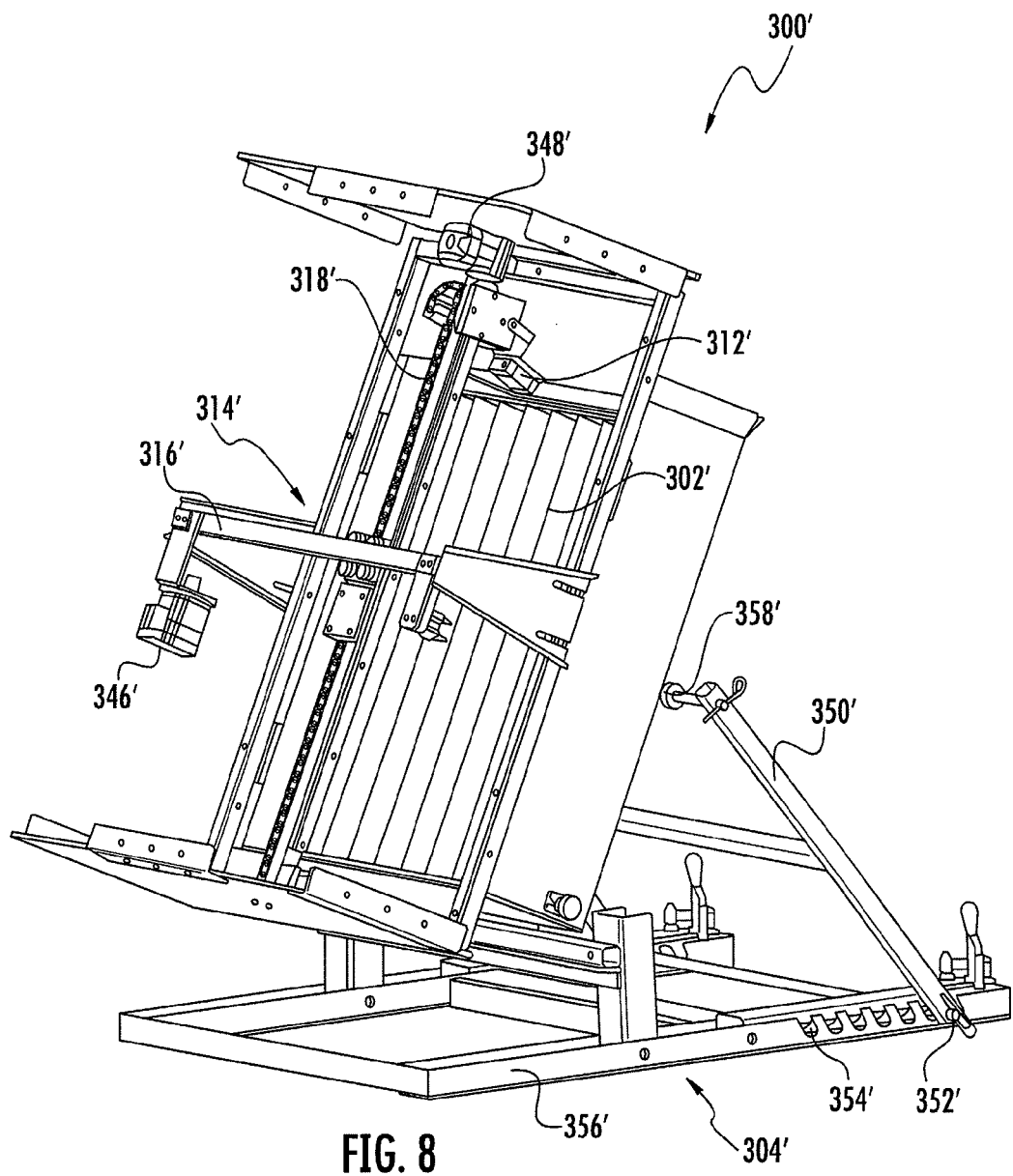
FIG. 8 illustrates a second embodiment of an automated seed package identification system in an identification configuration for a metal seed tray assembly in accordance with an example embodiment of the present invention.

It should be noted that the automated seed package identification system 300 illustrated in FIGS. 3-7 is just one embodiment of various embodiments of automated seed package identification systems which may employ the teachings presented herein. In this regard, FIG. 8 illustrates a second embodiment of a seed package identification system 300', which is shown without an optional protective cover for example purposes. The second embodiment of the automated seed package identification system 300' may comprise many of the features of the first embodiment of the automated seed package identification system 300. For example, the automated seed package identification system 300' may comprise a sensor device 312', a sensor positioning mechanism 314' (including a stationary track member 316' and a moveable track member 318'), and a control unit (not shown). As previously noted, the automated seed package identification system 300' may comprise the stationary electric motor 346' which is configured to translate the moveable track member 318' and the moveable electric motor 348' which is configured to translate the sensor device 312'. Thus, in many respects the second embodiment of the automated seed package identification system 300' is substantially similar to the first embodiment of the automated seed package identification system 300.

The second embodiment of the automated seed package identification system 300' differs mainly in that it comprises a stand 304' with different features. In this regard, the stand 304' may include one or more legs 350' with lower ends 352' which are configured to engage a plurality of slots 354' in a base member 356' of the stand. An upper end 358' of the legs 350' engages the remainder of the automated seed package identification system 300' to provide support thereto. Thereby, by moving the lower ends 352' of the legs 350' between the various slots 354' in the base member 356', the angle of the automated seed package identification system 300' with respect to vertical may be adjusted. Accordingly, the automated seed package identification system 300' may be configured to position a seed tray assembly 302' in an identification configuration. In this regard, the illustrated embodiment of the seed tray assembly 302' does not include pockets and may be formed from a material, for example aluminum, which is not configured to deflect and provide an interference fit with seed packages. Accordingly, the automated seed package identification system 300' illustrated in FIG. 8 may be configured to position the seed tray assembly 302' in an identification position wherein the seed tray assembly defines an angle with respect to a vertical direction, wherein the seed packages do not fall out of the seed tray assembly and do not fall over. Accordingly, the sensor device 312' may read the machine-readable identifiers on the seed packages.

As previously mentioned, embodiments of the automated seed package identification system 300, 300' may comprise a control unit. The control unit may be configured to instruct the sensor positioning mechanism 314, 314' to adjust the position of the sensor device 312, 312' with respect to the seed tray assembly 302, 302'. The control unit may be further configured to instruct the sensor device 312, 312' to read the machine-readable package identifiers 230 of the seed packages 200 to thereby record a positional layout of the seed packages. Thereby, the control unit may compare the positional layout of the seed packages 200 to a desired layout of the seed packages. Additionally, the control unit may be configured to indicate which of the seed packages 200 does not match the desired layout, and/or which of the seed packages were not successfully identified.

Figure 9:
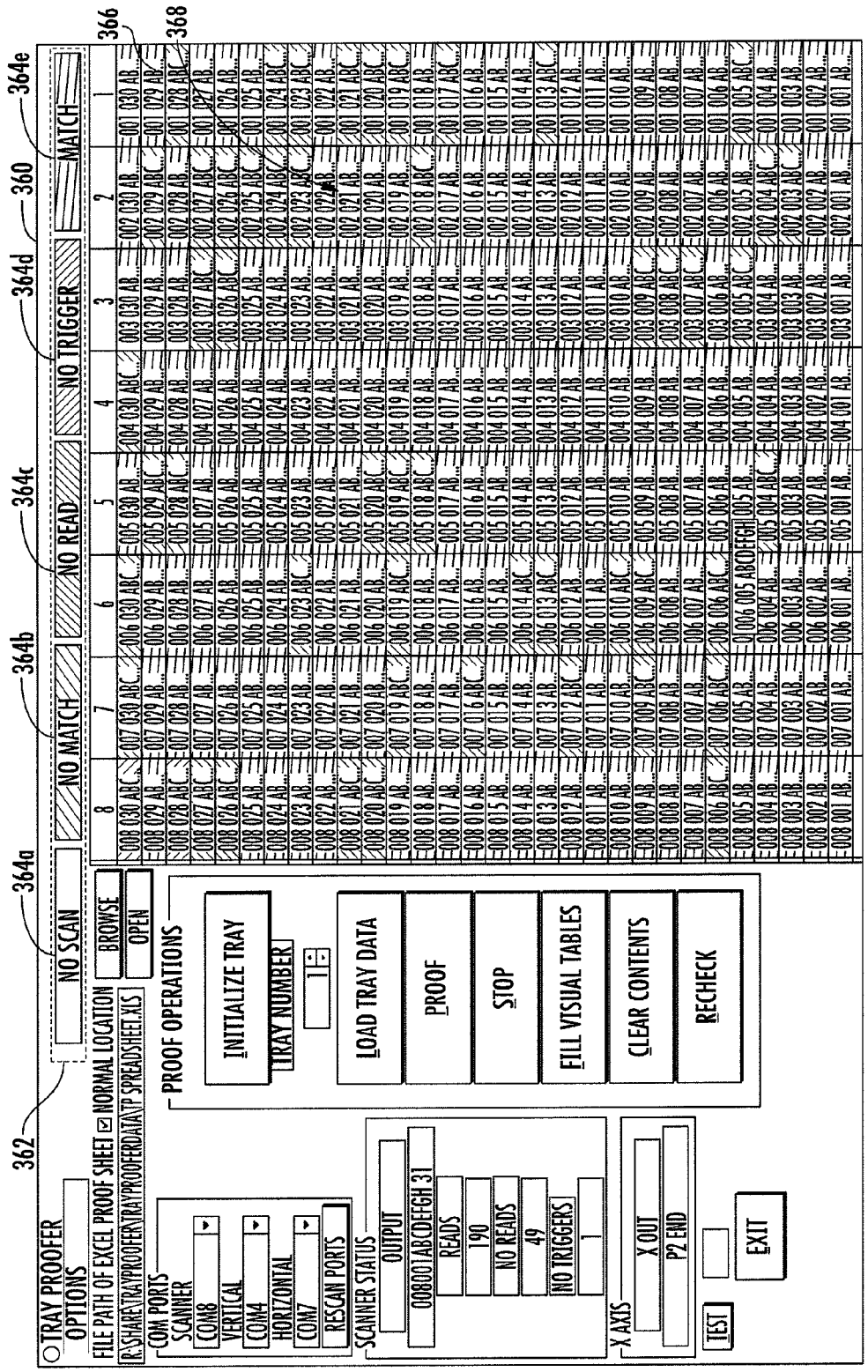
FIG. 9 illustrates a screenshot from a monitor displaying a representation of the seed tray assembly in accordance with an example embodiment of the present invention.
Figure 10:
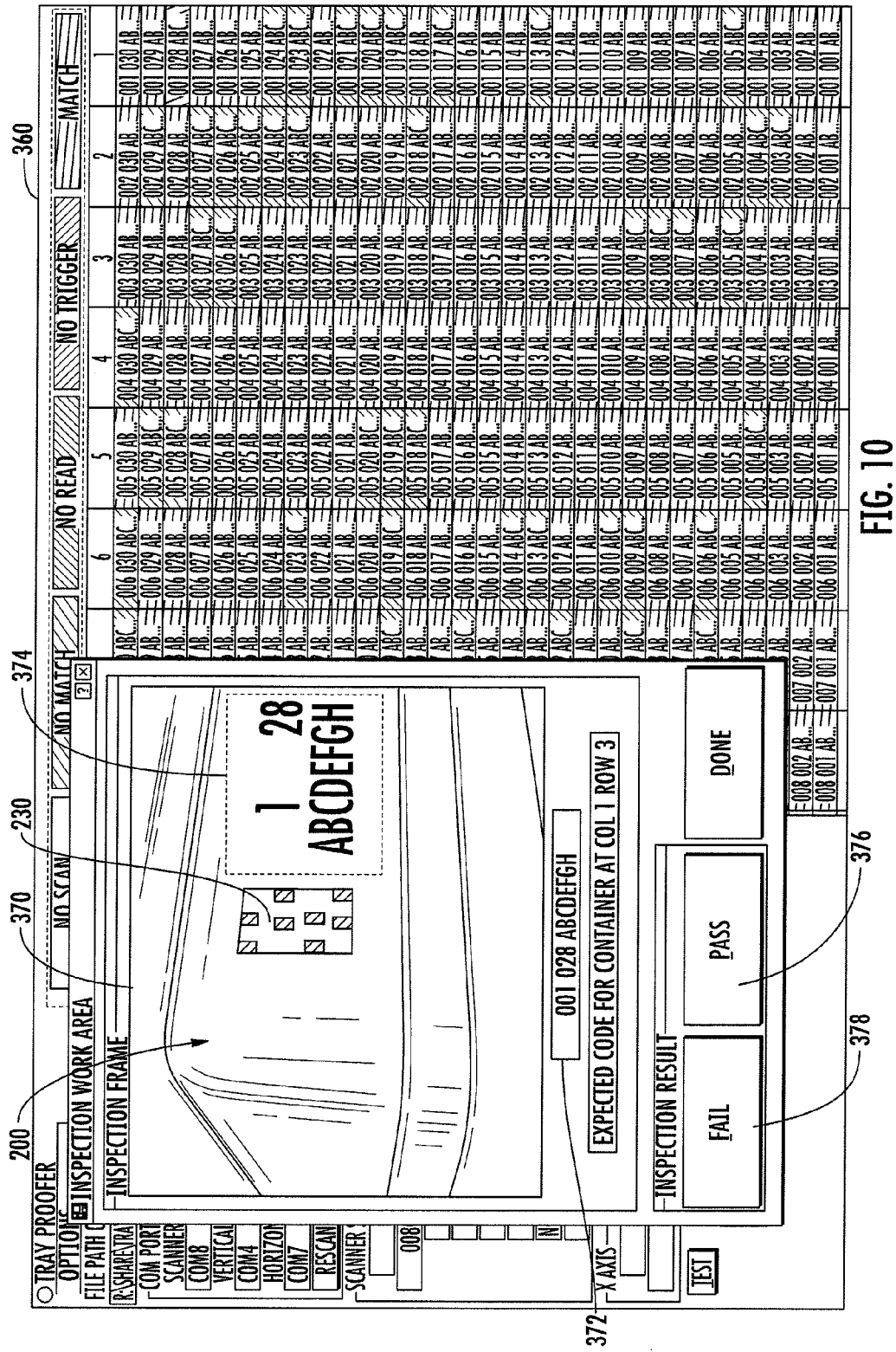
FIG. 10 illustrates a screenshot from the monitor of FIG. 9 displaying an image of an unread seed package in accordance with an example embodiment of the present invention.

For example, as illustrated in FIGS. 9-11, the automated seed package identification system 300, 300' may include a monitor 360 or other output device which displays a representation of the seed tray assembly 302, 302'. In some embodiments the sensor device 312, 312' may be configured to read a machine-readable tray identifier on the seed tray assembly 302, 302' which includes layout information so that the control unit may thereby determine the desired layout of the seed packages 200. The machine-readable tray identifier may, for example, comprise a barcode, text, RFID transponder, 3D barcode, or other identifier which identifies the seed tray assembly 302, 302' and/or the desired layout of the seed packages 200.

Thus, the automated seed package identification system 300, 300' may determine which of the seed packages 200 do not match the desired layout. For example, the monitor 360 may indicate which of the seed packages 200 do not match the desired layout by assigning a specified color or other identifier therewith. In the embodiment illustrated in FIG. 9, a legend 362 includes various identifiers 364 that explain the colors associated with a plurality of cells 366 in a table 368 corresponding to the seed packages 200 in the seed tray assembly 302, 302'. For example, a no scan identifier 364a may indicate any cells 366 corresponding to seed packages 200 that are not yet scanned. In the illustrated embodiment, the scanning operation is complete, so none of the cells 366 include this identifier. Further, a match identifier 364e may indicate those cells 366 corresponding to seed packages 200 that match the desired layout. Thus, in the illustrated embodiment, the majority of the seed packages 200 that have been scanned match the desired layout.

In embodiments in which a proximity sensor is employed, a no trigger identifier 364d may indicate any cells 366 corresponding to seed packages 200 for which proximity to the seed packages is not detected. For example, if the seed packages 200 are damaged or improperly inserted into the seed tray assembly 302, 302', proximity may not be detected. Further, a no read indicator 364c may indicate any cells 366 corresponding to seed packages 200 which have not had their machine-readable package identifiers 230 successfully read. For example, the machine-readable package identifier 230 may be damaged or improperly positioned on the seed packages 200.

As illustrated in FIG. 10, when a user selects one of the cells 366 in the table 368 that has not been successfully read, the monitor 360 may display an image 370 of the seed package 200 that has not had its machine-readable package identifier 230 successfully read. Thereby, the user may view the seed package 200 and provide for confirmation of whether or not the seed package matches the desired layout. For example, the monitor 360 may display an expected code 372 for the seed package 200 corresponding to the desired layout. Thus, the user may view the image 370 to determine whether an actual code 374 on the seed package 200 (which may be alpha-numeric, and hence human-readable) matches the expected code 372. Thereby, the user may select a pass 376 or fail 378 button to confirm whether or not the actual code 374 on the seed package 200 matches the expected code 372. After selecting one of the pass 376 or fail 378 buttons, the cell 366 corresponding thereto will change color (or otherwise adapt) to correspond to the match indicator 364e or a no match indicator 364b, so the user may keep track of those no-read cells which the user has reviewed.

As indicated in FIG. 11, the monitor 360 may also indicate a position of one of the seed packages 200 that would match the desired layout of the seed packages for one of the seed packages that does not match the desired layout. For example, the user may select a cell 366 corresponding to a seed package 200 that is read but does not match the desired layout. Thereby, the monitor 360 may display the expected code 372, the actual (e.g. scanned) code 374, and a position 380 of the seed package 200 that would match the desired layout. Thereby, the user may move the seed packages within the seed tray assembly 302, 302' as necessary to match the desired layout.

Figure 12:
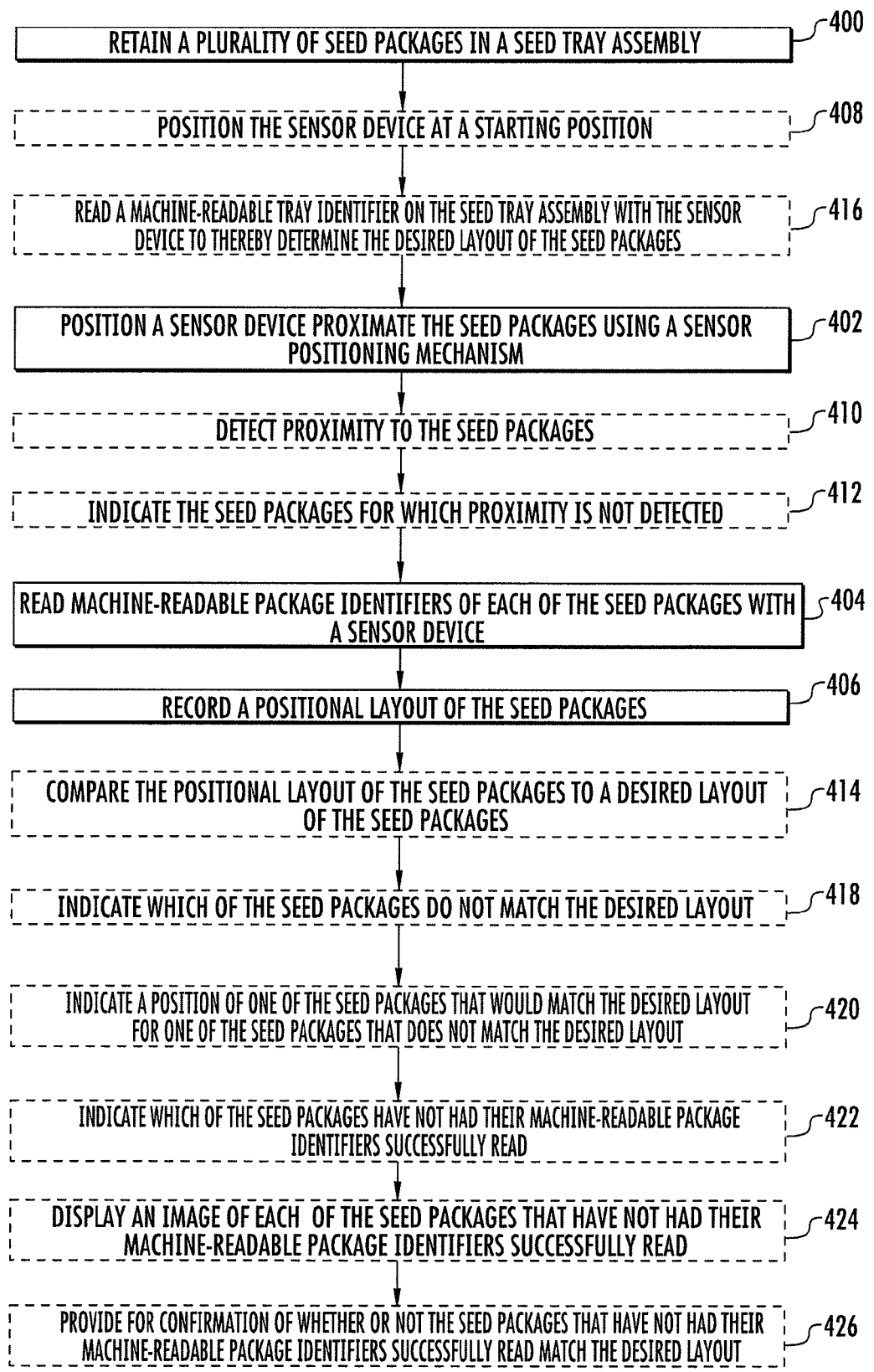
FIG. 12 illustrates a method of identifying a plurality of seed packages in accordance with an example embodiment of the present invention.

Embodiments of related methods are further provided herein. In this regard, FIG. 12 illustrates an embodiment of a method of identifying a plurality of seed packages each comprising one or more machine-readable package identifiers. As illustrated, the method may comprise retaining a plurality of seed packages in a seed tray assembly at operation 400. Further, the method may include positioning a sensor device proximate the seed packages using a sensor positioning mechanism at operation 402. Additionally, the method may include reading machine-readable package identifiers of each of the seed packages with a sensor device at operation 404. The method may also include recording a positional layout of the seed packages at operation 406.

In some embodiments the method may additionally or alternatively comprise other operations including those operations illustrated in dashed lines in FIG. 12. For example, the method may further comprise positioning the sensor device at a starting position at operation 408 prior to positioning the sensor device proximate the seed packages at operation 402. Also, the method may include detecting proximity to the seed packages at operation 410. Detecting proximity to the seed packages at operation 410 may occur prior to reading the machine-readable package identifiers at operation 404 in some embodiments. The method may also include indicating the seed packages for which proximity is not detected at operation 412.

Additionally, the method may comprise comparing the positional layout of the seed packages to a desired layout of the seed packages at operation 414. The method may also comprise reading a machine-readable tray identifier on the seed tray assembly with the sensor device to thereby determine the desired layout of the seed packages at operation 416. Reading the machine-readable tray identifier on the seed tray assembly at operation 416 may occur after positioning the sensor device at the starting position at operation 408 and before positioning the sensor device proximate the seed packages at operation 402 in some embodiments. Further, the method may include indicating which of the seed packages does not match the desired layout at operation 418.

Also, the method may include indicating a position of one of the seed packages that would match the desired layout for one of the seed packages that does not match the desired layout at operation 420. The method may additionally include indicating which of the seed packages have not had their machine-readable package identifiers successfully read at operation 422. Further, the method may include displaying an image of each of the seed packages that have not had their machine-readable package identifiers successfully read at operation 424. Additionally, the method may comprise providing for confirmation of whether or not the seed packages that have not had their machine-readable package identifiers successfully read match the desired layout at operation 426. Accordingly, various embodiments of methods of identifying seed packages are provided.

Figure 13:
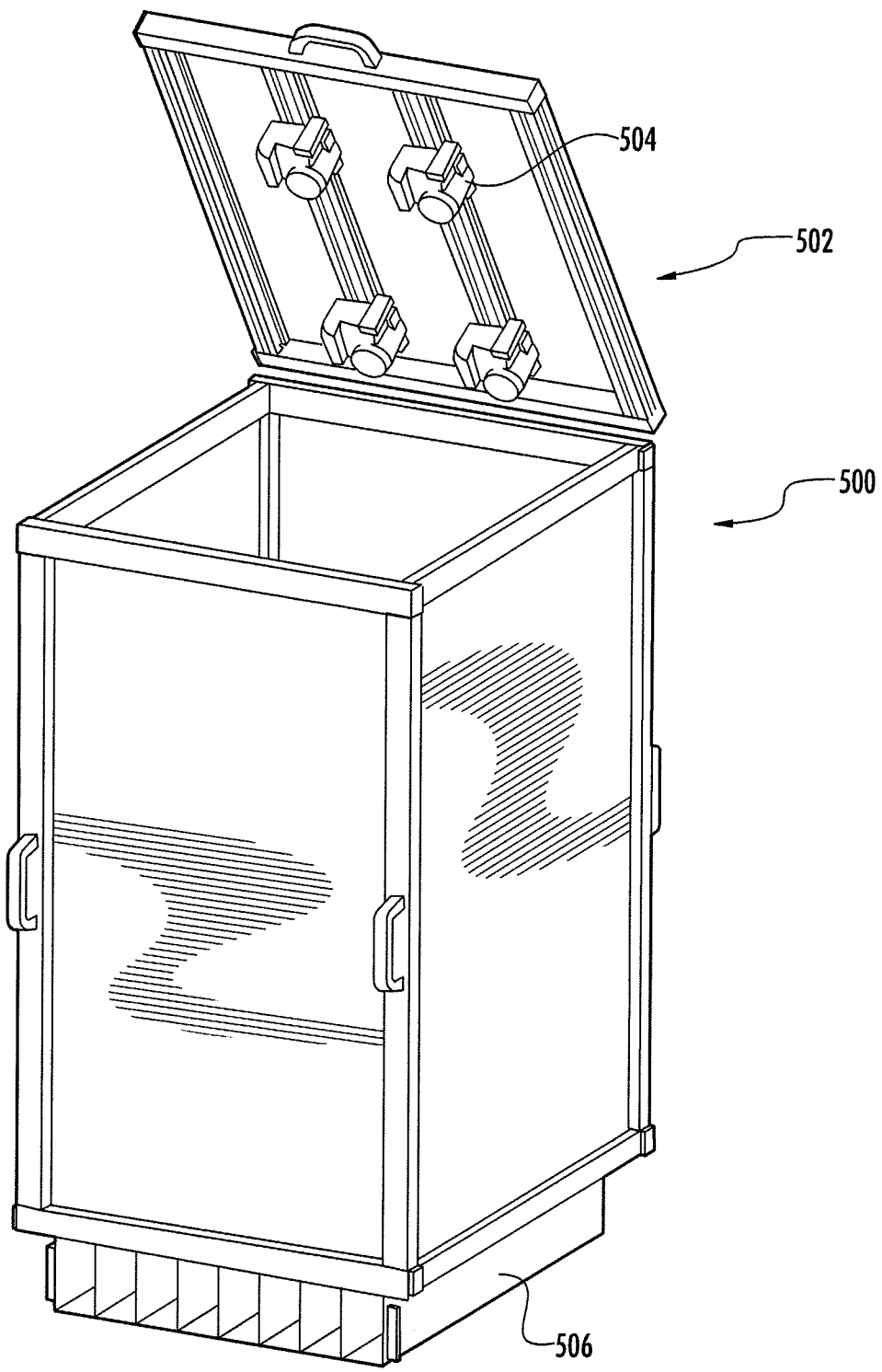
FIG. 13 illustrates an embodiment of an automated package identification system in accordance with another example embodiment of the present invention.

Another embodiment of the present invention is depicted in FIG. 13. In the depicted embodiment, an automated seed package identification system 500 is shown wherein the system 500 comprises an automated seed package identification apparatus 502 comprising one or more cameras 504 configured to capture one or more images of the seed package positions. Image processing software is used to verify the positions of the packages. In the depicted embodiment, the automated seed package identification apparatus 502 includes four cameras 504 that are configured to capture one or more images of seed packages contained in a seed tray assembly 506. It should be noted, however, that in other embodiments as few as one camera may be used.

In still other embodiments, additional cameras may be used. In various embodiments, the seed tray assembly 506 may be positioned below the cameras, beside the cameras, or at an angle with respect to the cameras. In the depicted embodiment, the seed tray assembly 506 is placed below the cameras 504.

In the depicted embodiment, the seed tray assembly 506, which contains some unknown number of seed packages, is loaded into the automated seed package identification system 500. In various embodiments, the seed tray assembly 506 may be manually loaded and positioned by an operator or, in some embodiments, the seed tray assembly 506 may be automatically conveyed to the automated seed package identification system 500. In some embodiments, the seed tray assembly 506 may be shielded from external light sources and the automated seed package identification system 500 may be configured to use lights contained within the system to illuminate the seed tray assembly 506. In various embodiments, the seed tray assembly 506 may be shielded using different methods, including, but not limited to, providing an enclosed structure into which the cameras 504 and the seed tray assembly 506 may be placed, such as in the depicted embodiment. Other methods of eliminating light gaps between the cameras 504 and the seed tray assembly 506 include, but are not limited to, placing the seed tray assembly 506 closer to the cameras 504, placing the cameras 504 closer to the seed tray assembly 506, or providing a flexible membrane between the cameras 504 and the seed tray assembly 506.

Once the seed tray assembly 506 is ready for processing, the cameras 504 are used to capture one or more images of the seed packages in the seed tray assembly 506. In embodiments using a single camera, the camera may be connected to a support structure and positioned so as to capture an image of the whole seed tray assembly 506. In other single camera embodiments, the camera may be attached to the support structure so as to allow the camera to pivot around one or more axes, thus permitting the camera to take one or more images (e.g., an array of images) that cover the whole seed tray assembly 506. In this configuration, a pivot mechanism may be used and the pivot mechanism may be controlled by a position control system, which in some embodiments may be associated with (such as, for example, combined with) the control unit described above. If more than one camera is used, such as in the depicted embodiment, the cameras may be attached to the support structure and positioned so that an array of images from the cameras 504 covers the whole seed tray assembly 506. In some embodiments, the system 500 may also be configured to automatically adjust parameters of the cameras and/or of the images such as, but not limited to, image resolution, contrast, image type, etc.

Once the one or more images are captured by the cameras, the images may then be transferred to an image processing system. In various embodiments, the image processing system may be, for example, a dedicated image processing device, a personal computer, a server, series of servers, a network cloud, or some other configuration. If more than one image is captured per seed tray assembly, the image processing system may be configured to merge the multiple images into one image before the image processing system processes the image. The image processing system may also be configured to process each image separately and then merge the data generated from the images after the images are processed.

In various embodiments, image processing may be accomplished in variety of ways. In the depicted embodiment, the images may be processed by first identifying one or more areas of interest in the image. The coordinates of the areas of interest may be predefined in a data store and then accessed by the processing system. The processing system may also have access to one or more predefined lists of coordinates and may choose what list to use based on either an external signal to the processing system or by using a defined perimeter in the image. The system may also define the coordinates of the one or more areas of interest by looking for and utilizing know structures in the image, such as by using a vision system.

Once the areas of interest are defined, the processing system may then extract subsets of the image from one or more area of interests using software, (e.g., LEADTools Imaging Pro available from Lead Technologies, Inc. (http://www.leadtools.com/default.htm)). Along with the image, information such as position within the seed tray assembly, position within the image, existence of a seed package, and existence of unique seed package identifiers and/or unique seed tray assembly identifiers, may also be obtained. This information may then be saved to a data store for later retrieval. Once an image has been extracted, the system may decode any identifiers (such as, for example, 1-D or 2-D barcodes), contained within the images using software (e.g., SwiftDecorder available from OmniPlanar (http://www.omniplanar.com/index.php)). The decoded information from the identifiers may then be linked to the information obtained by the previous step and may be stored in a data store.

Using the information generated from the processing system, a positional layout of the seed packages within the seed tray assembly 506 may be generated. As such, this information may be used as in the embodiments described above. For example, the layout may alert the user to a special situation, such as, for example, a missing seed package or an upside down seed package. The layout may also be compared to an expected layout and the user may be alerted to any difference between the expected layout and the actual layout.

Figure 14:
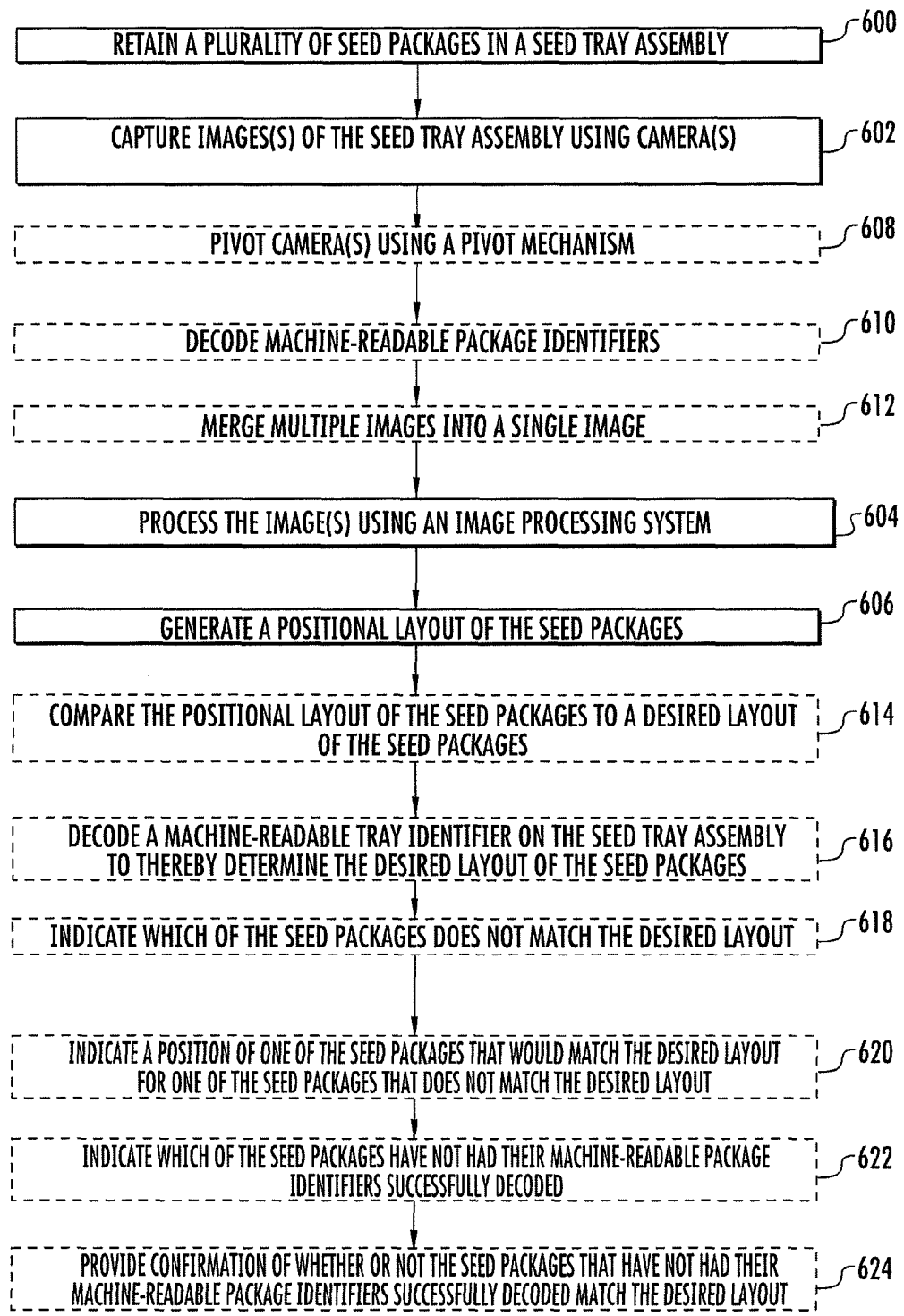
FIG. 14 illustrates a method of identifying a plurality of seed packages in accordance with another example embodiment of the present invention.

Embodiments of related methods are also provided herein. In this regard, FIG. 14 illustrates an embodiment of a method of identifying a plurality of seed packages in a seed tray assembly. As illustrated, the method may comprise retaining a plurality of seed packages in a seed tray assembly at operation 600. Further, the method may include capturing image(s) of the seed tray assembly using camera(s) at operation 602. Additionally, the method may include processing the image(s) using an image processing system at operation 604. The method may also include generating a positional layout of the seed packages at operation 606.

In some embodiments the method may additionally or alternatively comprise other operations including those operations illustrated in dashed lines in FIG. 14. For example, the method may further comprise pivoting the camera(s) using a pivot mechanism at operation 608. In various embodiments, pivoting the camera(s) using a pivot mechanism at operation 608 may occur prior to or after capturing image(s) of the seed tray assembly at operation 602. Also, the method may include decoding machine-readable package identifiers at operation 610. In various embodiments, decoding machine-readable package identifiers at operation 610 may occur prior to or after processing the image(s) using an image processing system at operation 604. Additionally, the method may comprise merging multiple images into a single image at operation 612. In various embodiments, merging multiple image(s) into a single image at operation 612 may occur prior to or after processing the image(s) using an image processing system at operation 604.

Additionally, the method may comprise comparing the positional layout of the seed packages to a desired layout of the seed packages at operation 614. The method may also comprise decoding a machine-readable tray identifier on the seed tray assembly to thereby determine the desired layout of the seed packages at operation 616. In various embodiments, decoding the machine-readable tray identifier on the seed tray assembly at operation 616 may occur prior to or after processing image(s) using an image processing system at operation 604. Further, the method may include indicating which of the seed packages does not match the desired layout at operation 618.

Also, the method may include indicating a position of one of the seed packages that would match the desired layout for one of the seed packages that does not match the desired layout at operation 620. The method may additionally include indicating which of the seed packages have not had their machine-readable package identifiers successfully decoded at operation 622. Further, the method may comprise providing for confirmation of whether or not the seed packages that have not had their machine-readable package identifiers successfully decoded match the desired layout at operation 624. Accordingly, various embodiments of methods of identifying seed packages are provided.

Although the apparatuses, systems, and methods herein are described generally in terms of use in conjunction with example embodiments of seed packages and seed tray assemblies, it should be understood, that the seed packages, seed tray assemblies and other elements described herein are provided by way of non-limiting example. Thus, other embodiments of seed packages, such as coin envelopes and other embodiments of seed tray assemblies configured to hold the seed packages may be employed in conjunction with the apparatuses, systems, and methods described herein. Further, the apparatuses, systems, and methods described herein may be useable in other contexts. Thereby, for example, the apparatuses, systems, and methods described herein may be employed in conjunction with other packages that need not necessarily be configured to contain seeds and further configured for use with tray assemblies adapted for use with the particular packages selected.

Many modifications and other embodiments of the invention set forth herein will come to mind to one skilled in the art to which these invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. An automated package identification system, the system comprising:
   a plurality of seed packages, wherein each seed package of the plurality of seed packages comprises one or more machine-readable package identifiers and is configured to receive one or more seeds;
   a seed tray assembly configured to retain the plurality of seed packages, wherein the seed tray assembly is configured for operative coupling to a seed planter, and wherein the seed planter is configured to selectively release the seeds from the plurality of seed packages;
   a tray assembly stand configured to position the seed tray assembly in an identification configuration; and
   an automated package identification apparatus comprising:
      a sensor device configured to read the machine-readable package identifiers of the seed packages;
      a sensor positioning mechanism configured to effect selective translation of the sensor device relative to the seed tray assembly to thereby adjust a position of the sensor device with respect to the seed tray assembly; and
      a control unit configured to instruct the sensor positioning mechanism to adjust the position of the sensor device with respect to the seed tray assembly and configured to instruct the sensor device to read the machine-readable package identifiers of the seed packages to thereby record a positional layout of the seed packages.

2. The automated seed package identification system of claim 1, wherein the plurality of seed packages have a desired positional layout within the seed tray assembly, and wherein the control unit is further configured to compare the recorded positional layout of the seed packages to the desired layout of the seed packages.

3. The automated seed package identification system of claim 2, wherein the control unit is further configured to indicate which of the seed packages does not match the desired positional layout.

4. The automated seed package identification system of claim 2 wherein the sensor device is further configured to read a machine-readable tray identifier on the seed tray assembly to permit the control unit to thereby determine the desired layout of the packages.

5. The automated seed package identification system of claim 1, further comprising an adjustable bracket coupling the sensor device to the sensor positioning mechanism, wherein the adjustable bracket is configured to adjust at least one of an angle of the sensor device with respect to the seed tray assembly and a distance between the sensor device and the seed tray assembly.

6. The automated seed package identification system of claim 1 wherein the sensor device comprises a device selected from the group consisting of:
   a bar code reader;
   an OCR reader;
   an RFID reader;
   a digital camera; and
   combinations thereof.

7. The automated seed package identification system of claim 1 wherein the tray assembly stand positions the seed tray assembly at an angle with respect to a vertical direction.

8. A method of identifying a plurality of seed packages, the method comprising:
   positioning one or more seeds within each respective seed package of a plurality of seed packages;
   retaining the plurality of seed packages in a seed tray assembly;
   positioning a sensor device proximate to the seed packages using a sensor positioning mechanism;
   reading the machine-readable package identifiers of each of the seed packages with the sensor device;
   recording a positional layout of the seed packages;
   comparing the recorded positional layout of the seed packages to a desired positional layout of the seed packages; and
   indicating which of the seed packages do not match the desired positional layout.

9. The method of identifying a plurality of seed packages of claim 8, further comprising, for at least one of the seed packages that does not match the desired positional layout, indicating a position of the seed packages that would match the desired positional layout.

10. The method of identifying a plurality of seed packages of claim 8, further comprising indicating which of the seed packages have not had their machine-readable package identifiers successfully read.

11. The method of identifying a plurality of seed packages of claim 10, further comprising displaying an image of each of the seed packages that have not had their machine-readable package identifiers successfully read.

12. The method of identifying a plurality of seed packages of claim 11, further comprising providing confirmation of whether or not the seed packages that have not had their machine-readable package identifiers successfully read match the desired positional layout.

13. The method of identifying a plurality of seed packages of claim 8, further comprising positioning the sensor device at a starting position prior to positioning the sensor device proximate to the seed packages, wherein the step of the sensor device proximate to the seed packages comprises moving the sensor device from the starting position to a position proximate to the seed packages.

14. The method of identifying a plurality of seed packages of claim 8, further comprising detecting proximity to the seed packages prior to reading the machine-readable package identifiers of each of the packages.

15. The method of identifying a plurality of seed packages of claim 14, further comprising indicating the seed packages for which proximity is not detected.

16. An automated seed package identification system, the system comprising:
   a seed tray assembly configured to retain a plurality of seed packages, wherein the seed tray assembly is configured for operative coupling to a seed planter;
   a sensor device configured to read a plurality of machine-readable package identifiers from the plurality of packages retained in the seed tray assembly;
   a sensor positioning mechanism configured to effect selective translation of the sensor device relative to the seed tray assembly to thereby adjust a position the sensor device with respect to the seed tray assembly; and
   a control unit configured to instruct the sensor positioning mechanism to adjust the position of the sensor device with respect to the seed tray assembly and configured to instruct the sensor device to read the machine-readable package identifiers of the seed packages to thereby record a positional layout of the seed packages.

17. The automated seed package identification system of claim 16 wherein the sensor positioning mechanism comprises a stationary track member and a moveable track member.

18. The automated seed package identification system of claim 17 wherein the moveable track member is configured to translate along the stationary track member.

19. The automated seed package identification system of claim 18 wherein the sensor device is configured to translate along the moveable track member.

20. The automated seed package identification system of claim 18, further comprising a stationary electric motor configured to translate the moveable track member and a moveable electric motor configured to translate the sensor device.

21. The automated seed package identification system of claim 18, further comprising a moveable track carriage which moveably couples the moveable track member to the stationary track member and a sensor carriage which moveably couples the sensor device to the moveable track member.

22. The automated seed package identification system of claim 16, further comprising an adjustable bracket coupling the sensor device to the sensor positioning mechanism, wherein the adjustable bracket is configured to adjust at least one of an angle of the sensor device with respect to the seed tray assembly and a distance between the sensor device and the seed tray assembly.

23. An automated seed package identification system, the system comprising:
   a plurality of seed packages, wherein each seed package of the plurality of seed packages comprises one or more machine-readable package identifiers and is configured to receive one or more seeds;
   a seed tray assembly configured to retain the plurality of seed packages, wherein the seed tray assembly is configured for operative coupling to a seed planter, and wherein the seed planter is configured to selectively release the seeds from the plurality of seed packages; and
   an automated package identification apparatus comprising:
      one or more cameras configured to capture one or more images of the plurality of seed packages retained in the seed tray assembly; and
      an image processing system configured to process the one or more images and to generate a positional layout of the seed packages in the seed tray assembly.

24. The automated seed package identification system of claim 23, wherein the automated seed package identification apparatus comprises a single camera and further comprises a pivot mechanism configured to pivot the camera around one or more axes.

25. The automated seed package identification system of claim 24, wherein the pivot mechanism is controlled by a position control system.

26. The automated seed package identification system of claim 23, wherein the automated seed package identification apparatus comprises multiple cameras and wherein the image processing system processes an array of images that cover the seed tray assembly.

27. The automated seed package identification system of claim 26, wherein the image processing system is further configured to merge the array of images into one image before the image processing system processes the image.

28. A method of identifying a plurality of seed packages, the method comprising:
   positioning one or more seeds within each respective seed package of a plurality of seed packages
   retaining the plurality of seed packages in a seed tray assembly;
   capturing one or more images of the seed tray assembly using one or more cameras;
   processing the one or more images using an image processing system;
   generating a positional layout of the seed packages in the seed tray assembly; and
   merging the multiple images into one image before processing by the image processing system,
   wherein the step of capturing one or more image of the seed tray assembly comprises capturing multiple images of the seed tray assembly using multiple cameras.

29. The method of claim 28, wherein the operation of capturing one or more images of the seed tray assembly comprises capturing multiple images of the seed tray assembly using a single camera, and further comprises pivoting the camera around an axis using a pivot mechanism to capture the multiple images.

30. A method of processing an image of seed packages in a seed tray assembly the method comprising:
   capturing an image of a plurality of seed packages in a seed tray assembly, each seed package holding one or more seeds, wherein the image is captured by one or more cameras of an automated package identification system;
   identifying a plurality of areas of interest in the image;
   processing subsets of the image contained within the areas of interest; and
   generating a representation of the seed tray assembly using the subsets of the image contained within the areas of interest; and
   at least one of:
      using a predefined list of coordinates representing the areas of interest; and
      defining coordinates of the areas of interest from known structures in the image.

31. The method of processing an image of seed packages in a seed tray assembly of claim 30, wherein the coordinates are stored in a data store.

32. The method of processing an image of seed packages in a seed tray assembly of claim 30, further comprising decoding one or more machine-readable identifiers within the subsets of the image, and combining the defined coordinated with the decoded machine readable identifiers.

33. The method of processing an image of seed packages in a seed tray assembly of claim 32, wherein the representation of the seed tray assembly is stored in a data store.

* * * * *